Nov. 24, 1953     C. B. RICHEY     2,660,016
TRASH CLEARING DEVICE FOR CORN HARVESTERS
Filed Aug. 13, 1951     2 Sheets-Sheet 1
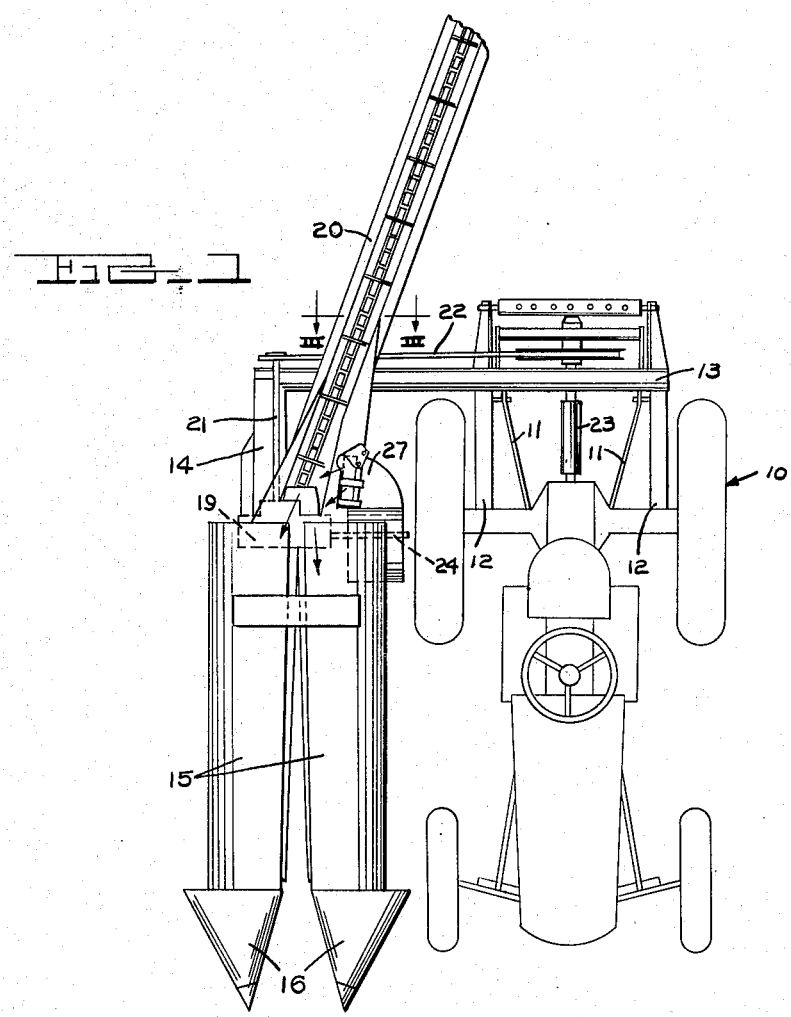
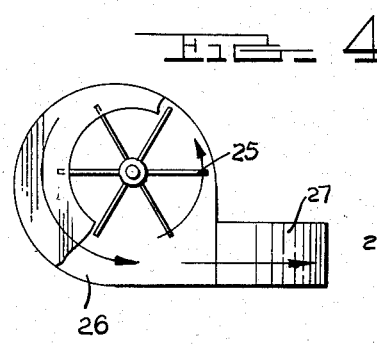
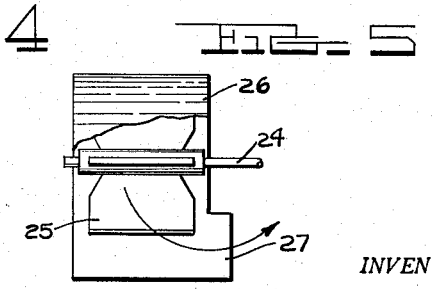
INVENTOR.
CLARENCE B. RICHEY
BY
ATTORNEY Nov. 24, 1953         C. B. RICHEY          2,660,016
           TRASH CLEARING DEVICE FOR CORN HARVESTERS
Filed Aug. 13, 1951                          2 Sheets-Sheet 2
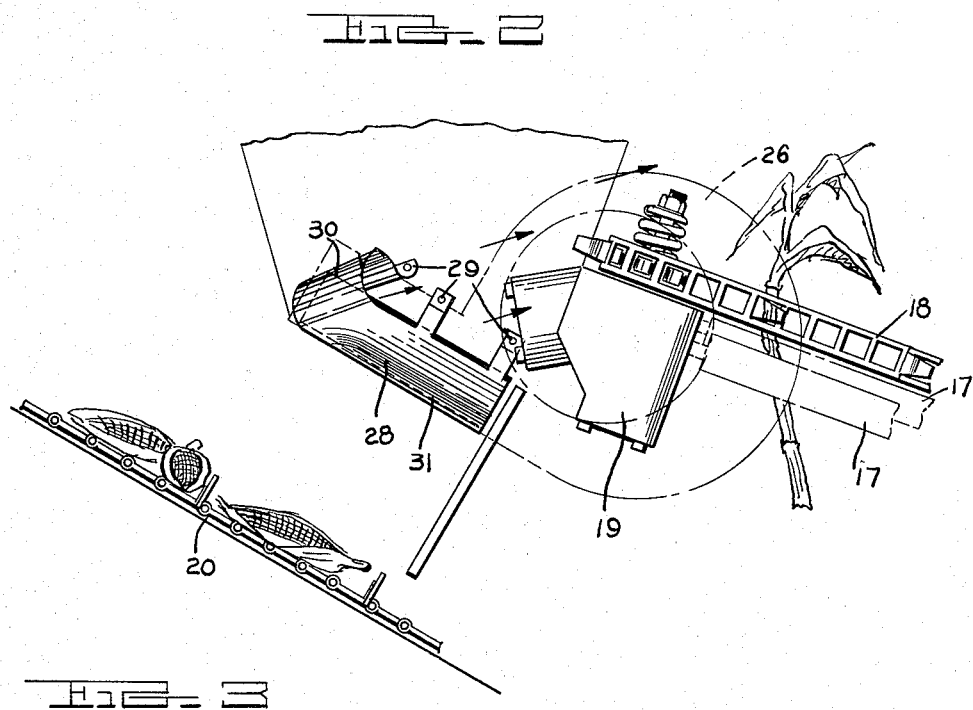
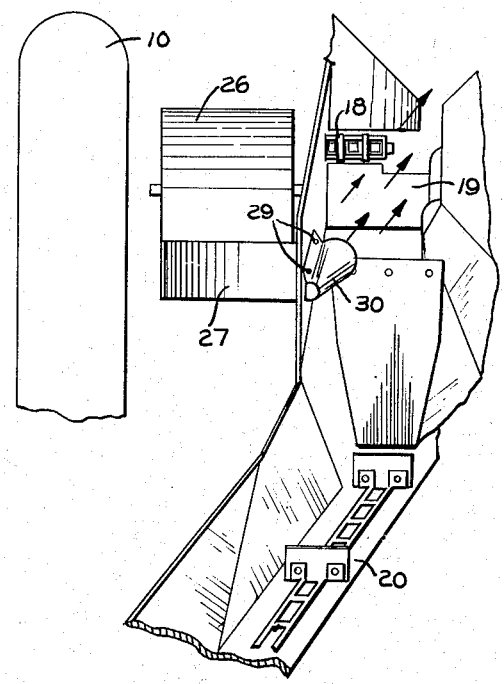
INVENTOR.
CLARENCE B. RICHEY
BY
ATTORNEY Patented Nov. 24, 1953

2,660,016

UNITED STATES PATENT OFFICE 2,660,016

TRASH CLEARING DEVICE FOR CORN HARVESTERS

Clarence B. Richey, Royal Oak, Mich., assignor to Dearborn Motors Corporation, Birmingham, Mich., a corporation of Delaware Application August 13, 1951, Serial No. 241,528

2 Claims. (Cl. 56—111)

The present invention relates to a trash clearing device for a corn harvester and more particularly to a blower for directing a current of air over the harvesting elements of a corn harvesting machine to clear the same as broken stalks and other trash.

In the mechanical harvesting of corn, the corn ears are generally removed from the associated stalks by contact with adjacent rearwardly and upwardly convergent snapping rolls through which the stalks, but not the ears, pass. In the harvesting of husked corn, the snapped corn is transferred to a husking bed composed of a plurality of husking rolls for removing the husks from the ears, following which the corn is conveyed by an elevator to a rearwardly located receptacle. In the case of stock feed corn or the like where the husks may remain upon the ear, the corn is conveyed directly from the snapping rolls to the receptacle. Under some operating conditions, particularly in corn infested with corn borers, broken stalks and other trash tend to clog the snapping rolls at their point of closest convergence, i. e., at the upper snapping ends thereof. Also, a portion of this trash may be carried over to the husking bed or corn elevator. It has been previously proposed that an air blast be directed across the corn elevator or the husking bed to physically lift the trash from the desired ears, but such methods have not proved generally satisfactory due to the fact that the trash is too heavy to be effectively buoyed up and conveyed by the air stream for effective removal.

The present invention now provides a trash clearing device wherein a blast of air is utilized to deflect broken stalks and similar trash into the snapping rolls for discharge by action of the convergent rolls in contrast to attempting to convey the trash out of the machine entirely by the air stream. In this manner, more effective utilization of the air blast is possible and the actual physical clearing of the trash is accomplished by the rolls rather than the air blast itself.

It is, therefore, an important object of the present invention to provide an air conveying arrangement for deflecting trash through the harvesting elements of a corn harvesting machine to separate and remove the same from the desired ears.

Another important object is the provision of means for deflecting an air blast against broken stalks and the like passing through a corn harvesting machine, so that the stalks are directed into the machine snapping rolls for discharge thereby.

It is a further object of this invention to provide a corn harvesting machine employing a pair of upwardly convergent snapping rolls with an air blast directed across the rolls so that trash is deflected to the rolls for discharge by the roll action rather than attempting to remove the trash by its buoyance in an air stream.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a fragmentary plan elevational view of a tractor-mounted corn harvesting machine equipped with a trash clearing device of the present invention;

Figure 2 is an enlarged fragmentary side elevational view, somewhat schematic in form illustrating operation of the trash clearing device;

Figure 3 is a fragmentary perspective view with parts broken away and in section taken from a point overlying the conveyor and looking forwardly toward the snapping rolls;

Figure 4 is a side elevational view, with parts broken away, of the blower utilized with the device of the present invention; and Figure 5 is an end elevational view with parts broken away of the blower of Figure 4.

As shown on the drawings:

In Figure 1, reference numeral 10 refers generally to a tractor of well-known make having rearwardly extending hitch links 11 and frame elements 12 supporting a transverse frame member 13 upon which a corn harvesting machine is supported. The harvesting machine is directly supported on a forwardly extending frame member 14, the machine including a pair of forwardly extending flare sheets 15 provided with forward snouts 16 and enclosing generally upwardly and rearwardly extending snapping rolls 17 (Figure 2). The snapping rolls 17 are forwardly divergent, as is conventional in the art, and stalk gathering chains 18 are provided to extend generally parallel to rolls 17 for grasping a stalk and pulling the same rearwardly within the machine so that the stalks pass between the rolls 17 with the ears being snapped from the stalk by the counterrotating rolls. The rolls 17 and the chains 18 are driven from a single centrally located gear box 19, and corn ears from the snapping rolls fall by gravity over the rear of the rolls 17 and the gear box 19 onto an upwardly and rearwardly extending snapped corn conveyor or elevator 20. It will be appreciated that the harvesting machine particularly illustrated in the drawings is of the type wherein the corn is harvested with the husks remaining thereon, inasmuch as no separate husking bed is provided, but the trash clearing device of the present invention is equally applicable to husking bed-type machines.

The gear box 19 from which the rolls and chains are driven receives power from a rearwardly extending shaft 21 driven, as by V-belt 22, from the power-take-off shaft 23 of the tractor. The same gear box 19 is utilized to drive a fan shaft 24 projecting transversely from the gear box for driving an air blast fan 25 mounted within an involute fan housing 26. The fan 25 is thus positioned immediately adjacent the snapping roll and chain elements 17, 18 of the machine, and the involute housing 26 is provided with a longitudinally extending discharge conduit 27 located rearwardly of the gear housing 19 and slightly therebelow.

In accordance with the present invention, the conduit 27 terminates in a deflector 28 (Figures 2 and 3) which is mounted over the outlet mouth of the conduit 27 and which is bolted or otherwise secured, as at 29, to the conduit 27. The deflector 28 comprises generally a laterally and forwardly extending portion 30 located adjacent the rearmost extremity of the conduit 27 and a bottom portion 31 extending forwardly and upwardly from the conduit opening. It is to be noted that both the housing portions 30, 31 are concave in configuration to deflect air from the conduit 27 upwardly and forwardly over the gear box 19 toward the harvesting elements of the machine, namely the rolls 17 and the chains 18.

This air blast, indicated generally by the directional arrows of Figures 2 and 3 and being directed oppositely to the path of snapped ears from the rolls 17 to the conveyor 20, will serve to deflect broken stalks and similar trash forwardly along the length of the machine harvesting elements. The air blast does not buoy up the trash by the blast effect, but rather serves to deflect the trash downwardly and forwardly toward the rolls 17, so that the trash may be grasped by the rolls and discharged from the machine by the aggressive action of the counterrotating rolls themselves. For example, a broken stalk travelling upwardly and rearwardly with the snapped ears will overhang the rear ends of the rolls prior to discharge thereover. The air blast will be directed against the underside of overhanging stalk portion to deflect the same upwardly, thereby tilting the stalk so that the lower stalk portion contacts the rolls and is pulled therethrough. Of course some relatively light trash, such as incidently removed husks and the like, may be blown from the machine by the buoyancy of the air stream, but the primary clearing action, particularly upon relatively heavy trash, will be obtained by the roll action as hereinbefore explained.

It will, of course, be understood that many details of construction may be varied through a wide range without departing from the principles of this invention, and it is, therefore, not the purpose to limit the patent granted hereon otherwise than necessitated by the scope of the appended claims.

I claim:

1. In a corn picker having a pair of juxtaposed inclined snapping rolls having elevated discharge ends, an air blower having a discharge opening located below and rearwardly of said elevated discharge ends, said discharge opening being directed upwardly and forwardly toward said discharge ends to deflect broken stalks and other trash forwardly between the rolls for discharge thereby.

2. In a corn picker having a pair of juxtaposed inclined snapping rolls having elevated discharge ends and a snapped corn elevator having a receiving portion underlying the roll discharge ends and extending rearwardly therefrom to convey ears snapped by the rolls and falling by gravity onto the elevator, an air blower having a discharge opening located below and rearwardly of said elevated discharge ends of said rolls and generally above the receiving portion of said elevator, said blower discharge opening being directed upwardly and forwardly toward said roll discharge ends and away from said elevator receiving portion to deflect broken stalks and other trash between said rolls for discharge thereby.

CLARENCE B. RICHEY.

References Cited in the file of this patent

UNITED STATES PATENTS

| Number | Name | Date |
|---|---|---|
| 1,660,767 | Ronning et al. | Feb. 28, 1928 |
| 2,340,084 | Scranton | Jan. 25, 1944 |
| 2,399,740 | Hyman | May 7, 1946 |
| 2,492,897 | Siefken | Dec. 27, 1949 |